J. B. FOOTE.
TRACTOR.
APPLICATION FILED OCT. 7, 1919.
1,373,608.
Patented Apr. 5, 1921.
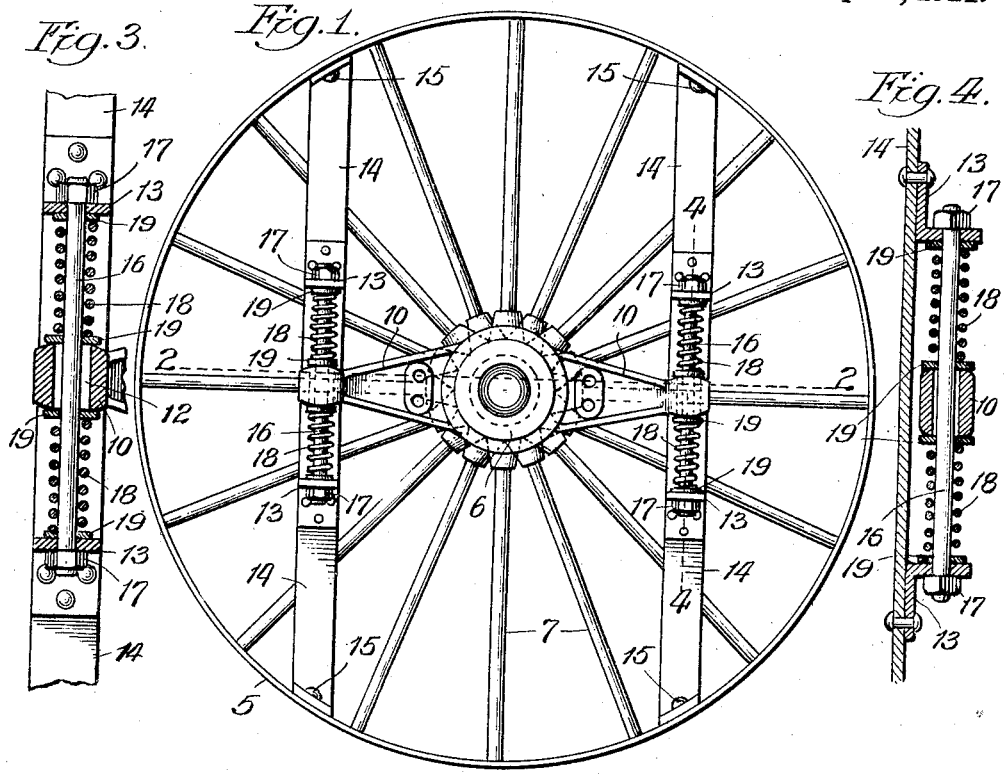
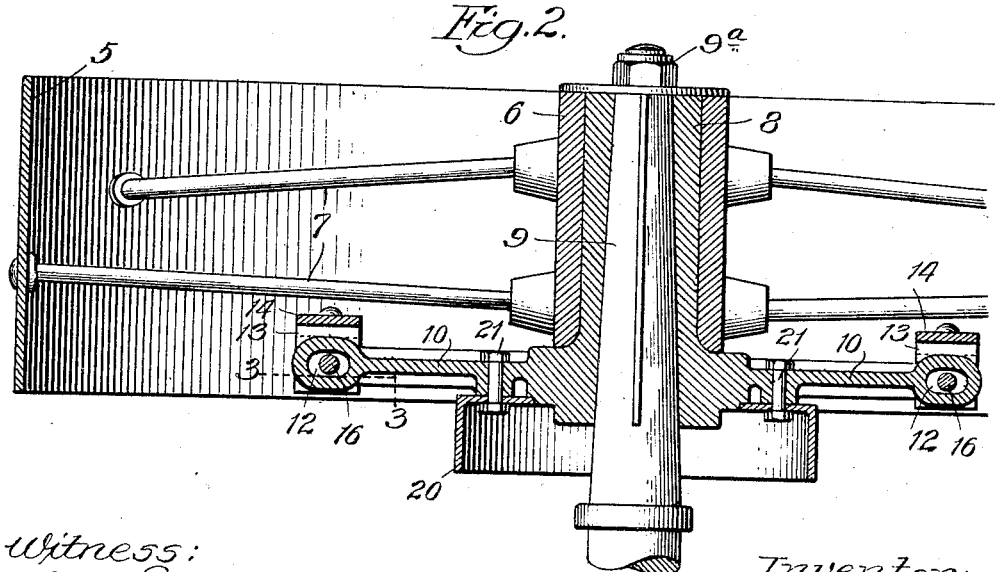
Witness:
John Enders
Inventor:
John B. Foote
by Fred Gerlach
his Atty.

UNITED STATES PATENT OFFICE.

JOHN B. FOOTE, OF OAK PARK, ILLINOIS.

TRACTOR.

1,373,608.  Specification of Letters Patent.  Patented Apr. 5, 1921.

Application filed October 7, 1919. Serial No. 329,103.

*To all whom it may concern:*

Be it known that I, JOHN B. FOOTE, a citizen of the United States, and a resident of Oak Park, in the county of Cook and State of Illinois, have invented certain new and useful Improvements in Tractors, of which the following is a full, clear, and exact description.

The invention relates to tractors and more particularly to the devices for driving the traction-wheels from their axles.

The object of the invention is to provide an improved cushioned driving-connection between the axle and the wheel-rim which avoids driving-stresses on the spokes.

The invention consists in the several novel features hereinafter set forth and more particularly defined by claims at the conclusion hereof.

In the drawings: Figure 1 is a side elevation of a traction-wheel embodying the invention. Fig. 2 is a section taken on line 2—2 of Fig. 1. Fig. 3 is a section taken on line 3—3 of Fig. 2 and Fig. 4 is a section taken on line 4—4 of Fig. 1.

The improved wheel comprises a rim 5, a hub 6 and spokes 7 between the hub and the rim. The hub 6 is rotatably mounted on a sleeve 8 which is keyed to the tapered outer end of an axle 9 so that the axle will be driven by the sleeve. A nut and washer 9ª removably hold the hub 6 on the sleeve 8 so that the wheel may be removed when desired. Oppositely disposed arms 10 are integrally formed on the sleeve 8 at the inner side of the hub 6 and the outer end of each of these arms is provided with a slot 12. Angle-lugs 13 are riveted to substantially straight bars 14 which have their ends flanged and riveted, as at 15, to the rim and form rigid chordal driving-members on the rim. Rods 16 disposed at one side of the bars 14 extend through the openings 12 in the arms and through the angle-brackets 13 on the bars 14 respectively. Nuts 17 are secured by screw-threads on the outer ends of the rods to secure them in the brackets 13. Cushion-springs 18 and washers 19 are interposed between the sides of each arm and the brackets 13 on the bars 14 so that the arms will operate to drive the wheel through the springs either in forward or reverse direction. The sides of each arm 10 are slightly convex for sliding engagement with the washers 19 which move in a rectilinear path, while the arm moves in a curvilinear path when relative movement between the arm and the wheel occurs. The slots 12 are of sufficient width to permit sufficient play of the arms transversely of the rods to transmit the driving stresses through the springs to the brackets 13. A brake-drum 20 is secured by bolts 21 to the arms 10 on the inner end of driving-sleeve 8 and when a brake is applied to said drum, the braking stresses will be applied to the wheel through the cushioned driving connections between the arms and the rims.

In operation, when the axle is driven, the arms 10 will each place one of the springs 16 under pressure and this pressure will be transmitted to the lugs 17 from which the stresses will be applied directly to the rim through the bars 14. This results in applying the driving stresses to the rim by means of cushioned driving devices and without subjecting the spokes to driving stresses.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a traction wheel comprising a rim, a hub and spokes, of a live axle supported in said wheel, a driving-member comprising a hub fixed on the axle and a rigid arm thereon, a substantially straight bar having its ends secured to the rim and spring connections between the outer end of the arm and said bar.

2. The combination with a traction wheel comprising a rim, a hub and spokes, of a live axle, a driving-member comprising a hub extending through and fitting in the wheel-hub and a rigid arm, a substantially straight bar having its ends secured to the rim and spring connections between the outer end of said arm and said bar.

3. The combination with a traction wheel comprising a rim, a hub and spokes, of a live-axle, a bar having its ends secured to the wheel, a driving-member comprising a hub fixed on the axle and a rigid arm, a substantially straight rod extending loosely through the outer end of said arm and having its ends secured to said bar and springs coiled around the rod and through which the driving stresses will be applied to the bar from the axle.

4. The combination with a traction wheel of a live-axle supported thereby, a driving-member comprising a hub rigidly secured to the axle and a driving arm, a spring connection between the arm and the wheel, and a brake drum rigidly secured to the driving-member.

JOHN B. FOOTE.